Patented June 30, 1936

2,045,651

UNITED STATES PATENT OFFICE 2,045,651

POLYMERIZATION PRODUCT AND PROCESS FOR MOLDING SAME

Rowland Hill, Manchester, England, assignor to Imperial Chemical Industries Limited, a corporation of Great Britain No Drawing. Application August 8, 1934, Serial No. 738,930

7 Claims. (Cl. 260—2)

This invention relates to a new polymerization product and a process for molding same and, more particularly, to polymerized methyl alpha methacrylate in solid form but containing innumerable small cavities, and to a process of preparing this form of polymerized methyl alpha methacrylate and molding same. This application is a continuation in part of applicant's copending application Serial No. 641,113, filed November 3, 1932, entitled "Resin and resin-forming compound".

An object of the present invention is to provide a simple and economical process of preparing molded articles comprising methyl alpha methacrylate. A further object is to provide a process wherein methyl alpha methacrylate polymer compositions may be employed in the comminuted form that heretofore known molding compounds have been used in the manufacture of molded articles. A still further object is to provide a commercially feasible process wherein the polymerization of methyl alpha methacrylate may be accomplished without careful control and yet a product be obtained having properties highly favorable for the manufacture of comminuted molding compounds. Other objects of the invention will be apparent from the description given hereinafter.

The above objects are accomplished according to the present invention by polymerizing monomeric methyl alpha methacrylate under conditions such as to give a solid mass full of small cavities, comminuting said mass, and molding said comminuted mass, either with or without pelleting, under heat and pressure.

Monomeric methyl alpha methacrylate may be obtained by treating methyl alpha hydroxyisobutyrate with a dehydrating agent, e. g. phosphorus pentoxide. Methyl alpha methacrylate is a water white liquid, boiling point 100–101° C. at atmospheric pressure, freezing point about −56° C., specific gravity 0.94 at 20° C. It may be polymerized, according to this invention, by means of heat, light, and/or catalysts, e. g., as described for the polymerization of organic vinyl esters in British Specification No. 15,271/1914. Preferably a catalyst such as oxygen, ozone, organic peroxide, and ozonide, or an agent giving off oxygen, is employed. The polymerization is effected in the absence of solvent or diluent, or in the presence of a negligible amount of either.

The polymerization of monomeric methyl alpha methacrylate is preferably carried out at an elevated temperature such as 60–100° C., or even at a higher temperature, such as 130° C. The polymerization reaction is strongly exothermic and, in order to obtain a clear, solid polymerized mass free of flaws or other internal defects, it is necessary to carefully control the conditions under which the polymerization takes place. Particularly is it necessary to carefully maintain a temperature control so that the exothermic heat of reaction does not greatly increase the temperature of the mass being polymerized. Where the monomer is being polymerized in relatively large bulk, as contrasted to minute quantities or larger quantities in thin films, the most careful control of the temperature is required to give a mass free of internal flaws.

While it is quite feasible to produce molded articles free of internal flaws by polymerizing the monomer directly in molds, the conditions under which the polymerization is carried out must be carefully controlled and the time of polymerization is relatively long. Accordingly, the production of molded articles in this manner is fairly expensive. According to the present invention, a great economy is effected by carrying out the polymerization of the monomer at a very rapid rate at relatively high temperatures and without any attempt at temperature control. When this is done with a relatively large bulk of the monomer, it inevitably results in a solid mass more or less opaque and full of small cavities. Presumably such cavities are caused by volatilization of the monomer, or possibly through substances in the mass such as occluded air, or auxiliary ingredients of high volatility. The volatilized substance as a gas may pass up through the bulk of material at the commencement of the polymerization but after the viscosity of the material increases as polymerization progresses it is no longer possible for this volatilized material to escape and hence innumerable small cavities are formed in the material. Depending somewhat on specific conditions, the polymerized solid mass may be full of small bubbles or may be of a more porous or pumice-like character but in all cases the mass is full of small cavities and a characteristic of the mass is its friability. The greater the percentage of cavities in the mass, the greater is this friability so that no advantage is gained by careful temperature control, and the like, during polymerization.

According to the present invention, advantage is taken of the polymerized solid mass full of cavities by comminuting same in any well known grinding apparatus to give a molding compound. This molding compound may be pelleted to put it in more convenient form for introduction into molds, or may be directly introduced into molds and molded under heat and pressure.

In order to illustrate the invention, the following examples are given:—

*Example 1.*—Monomeric methyl alpha methacrylate (b. p. 100–101° C.) is mixed with 0.5% by weight of benzoyl peroxide and the mixture is heated at 100° C. for four hours. On cooling a pumice-like mass is obtained. This is pulverized and, for example, 20 grams is introduced into a disc mold, 4″ diameter, which is then heated at 140–150° C. for two minutes under a pressure of 2 tons per square inch. The mold is cooled to below 60° C. and the molded disc ejected.

The molded disc is hard, tough, transparent, colorless, and free from bubbles. It has taken the shape of the mold perfectly. The molded substance does not soften at temperatures of 60–70° C. and does not becomes brittle at 0° C. It is highly resilient and possesses a high shock resistance. It does not absorb moisture.

As an alternative procedure and for the purpose of facilitating the molding operation the powdered polymer, prior to introduction into the mold, may be mixed with one-third its weight of butyl phthalate.

*Example 2.*—Four parts by weight of monomeric methyl alpha methacrylate and 1 part of dibutylphthalate are mixed and 0.04 parts of benzoyl peroxide are added. Polymerization is carried out as described in Example 1. The mass obtained is pulverized and molded at 90–100° C. and 1 ton per square inch pressure. The molded substance resembles that of Example 1, but softens at a somewhat lower temperature. It has a high shock resistance, somewhat lower than that of the product of Example 1.

*Example 3.*—To 100 parts of monomeric methyl alpha methacrylate are added 0.3 parts of sodium perborate and 0.65 parts of acetic anhydride. The mixture is then heated at 60° C. Polymerization sets in after 4 hours, and proceeds smoothly, the mass becoming more and more viscous, until after 20 hours, polymerization appears to be substantially complete.

The polymer so obtained is a hard, tough, perfectly colorless mass, transparent but filled with bubbles. The mass is pulverized ready for use in molding. An illustrative example of this will be given.

Twenty grams of the pulverized polymer are introduced into a 4″ diameter positive mold and subjected to a pressure of 8 tons per square inch at 125° C. for 2 minutes. The mold is then cooled to 95° C. and the molded disc ejected.

*Example 4.*—Thirty parts of monomeric methyl alpha methacrylate and 0.15 parts of benzoyl peroxide are mixed and 10 parts of titanium white and 10 parts of china clay are added to give a suspension. This is heated at 100° C. for 4 hours. The pigmented polymer is pulverized, and can then be molded into white opaque bodies which are light fast and possess good mechanical properties.

*Example 5.*—One hundred parts of monomeric methyl alpha methacrylate are mixed with 0.5 parts of benzoyl peroxide and 0.1 parts of the diazo dyestuff obtained by coupling tetrazotized diamino-di-p-xylolphenylmethane with β-naphthol. The dyestuff dissolves. The mixture is heated for 4 hours at 100° C. The so obtained polymer gives beautiful, transparent bright orange red molded bodies.

It will be understood that the above examples are merely illustrative and the invention broadly comprises polymerizing a composition chiefly composed of monomeric methyl alpha methacrylate under conditions such as to give a solidified mass full of small cavities and then comminuting said mass to granular form to give a molding compound which may be molded under heat and pressure into any desired shape.

There are numerous methods of polymerizing the monomer to get a solidified mass full of small cavities. Primarily these small cavities are caused by heat volatilizing some constituent of the mass being polymerized, although the rapidity of polymerization also seems to cause these cavities due, it is believed, not only to the exothermic heat generated during the reaction but also to the fact that occluded air and/or other gases are not freed from the mass until polymerization has progressed to a state where the mass is too viscous to permit escape of the gases.

Conditions that will give a maximum of small cavities, bubbles, pores, or the like, in the solidified mass are preferably maintained during polymerization because the resulting mass is thereby more readily comminuted and, further, it is easier to maintain such conditions and polymerization is effected in a shorter period. For this reason, the polymerization is carried out at elevated temperatures, preferably heating the mass to be polymerized to around 100° C. This accelerates the polymerization reaction and causes formation of gases giving, as an end product, a solidified mass full of small cavities. Heating to higher temperatures may be employed but in so doing volatilization of the monomer or auxiliary ingredients in the composition to be polymerized may take place to such an extent as to be uneconomical. Heating to a temperature as low as 60° C. may also be used successfully if the exothermic heat of reaction is not permitted to escape at the rate of its formation.

It is preferred to carry out the polymerization, according to the present invention, on relatively large bulks of the monomeric methyl alpha methacrylate as compared to polymerizing minute quantities or larger quantities in thin films. The reason for this is that, where the monomer is being polymerized in a relatively large bulk, obviously the exothermic heat of reaction cannot escape so readily and, as a result, the temperature inside the mass being polymerized quickly rises to a point where gases are being formed. It is for this reason that, even when the monomer is only heated to a temperature of 60° C., gases are formed within the material and, consequently, a solidified mass full of cavities is obtained. A further reason for polymerizing the monomer in bulk form rather than in thin films is that the distance a bubble of gas must travel through the material being polymerized in bulk form to escape from the mass is far greater than the distance the bubble must travel to escape where polymerization is carried out in thin films.

The selection of a catalyst, where it is desired to employ a catalyst, having great activity and the use of a relatively large amount of the catalyst, both tend to further increase the percent of small cavities in the material being polymerized since the accelerating of the polymerization reaction results in the generation of exothermic heat at a rate far in excess of that at which it is withdrawn form the mass.

According to this invention, various auxiliary agents may be added to the monomeric methyl alpha methacrylate either before polymerization or to the polymerized product in comminuted form. Among such materials may be mentioned filling materals, e. g. china clay, wood flour, asbestos, and the like, and coloring matters, both soluble and insoluble. Likewise, effect materials of the type of metallic powders and crushed mica may also be added.

Plasticizers may be added to the methyl alpha methacrylate compositions either prior to polymerization or subsequently thereto, as illustrated in the examples. The particular plasticizer selected and the quantity thereof employed will, of course, be dependent upon the particular use for which the composition is intended, as will be understood by those skilled in the art. Among plasticizers suitable for use in accordance with the present invention may be mentioned: camphor; phthalates, such as ethyl, propyl, isopropyl, butyl, isobutyl, cyclohexyl, methyl cyclohexyl, or benzyl phthalate or phthalates of the mixed type such as cyclohexyl butyl, benzyl butyl or butyl lauryl phthalate; esters of dibasic acids, such as the ethyl, propyl, isopropyl, butyl, isobutyl, cyclohexyl, methyl cyclohexyl or benzyl esters of succinic, fumaric, tartaric, adipic and sebacic acids; esters of monobasic acids, such as the butyl, isobutyl, cyclohexyl, methyl cyclohexyl, benzyl or lauryl esters of lauric, laevulinic, benzoic, benzoyl propionic and benzoyl benzoic acids; esters of polyhydric alcohols, e. g. glycol and glycerol, such as glycol benzoate, glycol laevulinate, triacetin, tripropionin and tributyrin; substituted toluene sulphonamides, such as ethyl paratoluenesulphonamide; substituted amides, such as tetraethyl phthalamide, tetrabutyl succinamide, tetrabutyl adipamide; hydrocarbons, such as dixylyl ethane; halogented hydrocarbons, such as chlorinated diphenyls and dichlordibenzyl; ether compounds such as dicresoxy ethyl ether; and non-drying or semi-drying oils, such as castor oil.

The solified polymerized methyl alpha methacrylate full of small cavities may be readily comminuted to granular form in any well known grinding apparatus such as a three-roll mill, or the like. If desired, this granular material may be formed into pellets which are subsequently introduced into molds for molding articles. This is well known molding shop practice and is optional. Despite the fact that the solified mass is full of small cavities, the bulk density of the material in granular form is entirely satisfactory for use in the standard molding shop equipment. Those skilled in the art will understand that by the term "bulk density" is meant the weight of the material per unit volume, materials of very low bulk density being extremely awkward to employ in the standard molding shop equipment.

The conditions under which the molding compound herein under consideration may be molded, can be varied widely. It is preferred that a temperature of at least 80° C. be employed for molding and, quite commonly, temperatures well above 100° C. are employed for this purpose, the most satisfactory temperature being somewhat dependent upon whether a plasticizer is employed and also the amount and activity of such plasticizer. Temperatures ranging anywhere from 80–200° C. may be suitably employed. The pressure may range from 0.1 to as high as 8 tons per square inch. Under certain circumstances, the use of an exceptionally high pressure in the neighborhood of 8 tons per square inch is advantageous where the molding apparatus employed is of heavy enough construction to stand such pressure. It is preferable that the mold be cooled to below 100° C. before the molded body is removed.

Molded products according to the present invention are surprisingly tough, hard, and rigid and generally possess a high mechanical strength which remains substantially unaffected by changes in atmospheric temperature. When the polymerization product is used alone, the molded bodies are colorless and light fast and possess a glass-like transparency. They remain practically unaffected by immersion for long periods in water. In electrical properties such as volume resistivity, phase angle difference, and freedom from tracking, these molded products are superior to those made from well known phenol-aldehyde compositions which find such a wide application in the electrical industry. These products are relatively uninflammable, tasteless and odorless.

The present invention is applicable for the preparation of molded products of all kinds and descriptions. It may be employed for the production of finished articles or for the production of intermediate shapes which are subsequently machined, ground, polished, or the like, to give a finished article. Likewise, the comminuted polymerized mass may be molded in the form of slabs, discs, sheets, or the like, for various uses such as interlayers in unsplinterable glass, and the like. Molded articles such as tableware, knick-knacks, novelty cases, cabinets, and the like, are readily made according to the present invention. By suitably choosing soluble dyestuffs and by stratifying, or otherwise filling the mold, variegated effects of remarkable beauty may be obtained.

An advantage of the present invention is that it provides such an economical and easily carried out process for making molded articles. Whereas methyl alpha methacrylate may be polymerized in a mold to give a finished article, the conditions under which this polymerization must be carried out to give an article free of internal visual flaws must be carefully controlled and the polymerization prolonged for an appreciable period. On the other hand, according to the present process, the polymerization may be carried out as rapidly as possible with little control of temperature or other conditions and yet the resulting product is much better suited for comminuting and use as a molding compound than would be the product of extremely careful polymerization having no small cavities or flaws whatsoever. A further and unexpected advantage of the present invention is that it gives a molding compound of very satisfactory bulk density, despite the fact that the polymerized mass before comminuting is filled with small cavities.

As many apparently widely different embodiments of this invention may be made without departing from the spirit and scope thereof, it is to be understood that the invention is not limited to the specific embodiments thereof except as defined in the appended claims.

I claim:

1. Process of preparing a moldable composition comprising heating a relatively large bulk of monomeric methyl alpha methacrylate to initiate polymerization and allowing said polymerizing action to proceed rapidly by having the exothermic heat of reaction build up in the mass until a solidified mass full of small cavities is formed.

2. Process of preparing a molding compound comprising heating a relatively large bulk of monomeric methyl alpha methacrylate to initiate polymerization, allowing said polymerizing action to proceed rapidly by having the exothermic heat of reaction build up in the mass until a solidified mass full of small cavities is formed, and comminuting said mass to granular form.

3. Process of preparing a molding compound comprising heating a composition chiefly composed of monomeric methyl alpha methacrylate to a temperature above 60° C., allowing the resulting polymerization action to proceed rapidly by having the exothermic heat of reaction build up in the mass until said methyl alpha methacrylate is polymerized to a solidified mass full of small cavities, and comminuting said mass to granular form.

4. Process of preparing a molding compound comprising heating a relatively large bulk of monomeric methyl alpha methacrylate to about 100° C. until said methyl alpha methacrylate is polymerized to a solidified mass full of small cavities, and comminuting said mass to granular form.

5. Process of preparing molded articles comprising heating a composition chiefly composed of monomeric methyl alpha methacrylate to a temperature above 60° C., allowing the resulting polymerization action to proceed rapidly by having the exothermic heat of reaction build up in the mass until said methyl alpha methacrylate is polymerized to a solidified mass full of small cavities, comminuting said mass, and molding said comminuted mass under heat and pressure.

6. Process of preparing molded articles comprising heating a relatively large bulk of monomeric methyl alpha methacrylate to about 100° C. until said methyl alpha methacrylate is polymerized to a solidified mass full of small cavities, comminuting said mass, and molding said comminuted mass under heat and pressure.

7. Process of preparing molded articles comprising heating a relatively large bulk of monomeric methyl alpha methacrylate to about 100° C. until said methyl alpha methacrylate is polymerized to a solidified mass full of small cavities, comminuting said mass, and molding said comminuted mass at a temperature above about 80° C. and a pressure above 0.1 ton per square inch.

ROWLAND HILL.